(12) United States Patent
Jacobsen (10) Patent No.: US 11,357,179 B2
(45) Date of Patent: Jun. 14, 2022

(54) DISTRIBUTOR APPARATUS FOR POSITIONING INDIVIDUAL PIECES OF GROWTH MEDIUM INTO A TRAY

(71) Applicant: Ellepot A/S, Esbjerg (DK)

(72) Inventor: Peter Meldgaard Jacobsen, Esbjerg (DK)

(73) Assignee: Ellepot A/S, Esbjerg N (DK)

(*) Notice: Subject to any disclaimer, the term of this patent is extended or adjusted under 35 U.S.C. 154(b) by 288 days.

(21) Appl. No.: 16/620,794

(22) PCT Filed: Jun. 12, 2018

(86) PCT No.: PCT/EP2018/065431
§ 371 (c)(1),
(2) Date: Dec. 9, 2019

(87) PCT Pub. No.: WO2019/001944
PCT Pub. Date: Jan. 3, 2019

(65) Prior Publication Data
US 2020/0137967 A1 May 7, 2020

(30) Foreign Application Priority Data
Jun. 28, 2017 (DK) .......................... PA 2017 00380

(51) Int. Cl.
*A01G 24/60* (2018.01)
*A01G 9/029* (2018.01)

(52) U.S. Cl.
CPC .......... *A01G 24/60* (2018.02); *A01G 9/0299* (2018.02)

(58) Field of Classification Search
CPC ...... A01G 9/0299; A01G 9/045; A01G 9/088; A01G 24/60
(Continued)

(56) References Cited

FOREIGN PATENT DOCUMENTS

| EP | 0722655 A1 | 7/1996 |
|---|---|---|
| NL | 8000659 A | 9/1981 |

(Continued)

OTHER PUBLICATIONS

International Search Report from PCT/EP2018/065431, dated Oct. 18, 2018.

*Primary Examiner* — Peter M Poon
*Assistant Examiner* — Kari A Bradberry
(74) *Attorney, Agent, or Firm* — Morse, Barnes-Brown & Pendleton, P.C.; Sean D. Detweiler, Esq.

(57) ABSTRACT

The present invention relates to a distributor apparatus adapted for positioning individual pieces of a length of growth medium cut into pieces of suitable size into a propagation tray. The distributor apparatus comprises a plurality of distributor units configured to move between a loading position and an unloading position. Each distributor unit comprises an open-ended channel or cavity adapted for receiving a whole number of growth medium pieces. The distributor units, in a loading position, are positioned relatively to each other such that their open-ended channels or cavities are disposed in continuation to each other to form a receiving unit with an open-ended channel or cavity adapted for receiving a single length of growth medium pieces. The distributor units, when in an unloading position, are rotated, relative to their loading position, such that their open-ended channels or cavities are disposed parallel relative to each other.

10 Claims, 14 Drawing Sheets

(58) Field of Classification Search
USPC .............................. 198/457.01, 457.05, 633
See application file for complete search history.

(56) References Cited

FOREIGN PATENT DOCUMENTS

| | | | |
|---|---|---|---|
| NL | 8701267 A | 12/1988 | |
| NL | 9200033 A | 8/1993 | |
| WO | WO-2008/013933 A2 | 1/2008 | |
| WO | WO-2017216146 A1 * | 12/2017 | ........... A01G 9/0299 |

* cited by examiner

DISTRIBUTOR APPARATUS FOR POSITIONING INDIVIDUAL PIECES OF GROWTH MEDIUM INTO A TRAY

RELATED APPLICATIONS

This application is a national stage filing under 35 U.S.C. 371 of International Application No. PCT/EP2018/065431, filed Jun. 12, 2018, which claims priority to Denmark Application No. PA 2017 00380, filed Jun. 28, 2017. The entire teachings of said applications are incorporated by reference herein.

TECHNICAL FIELD OF THE INVENTION

The present invention relates to the production of growth medium pots. More particularly, the present invention relates to an apparatus and system for positioning a length of growth medium cut into pieces of suitable size into a propagation tray.

BACKGROUND OF THE INVENTION

For the propagation of plants, starting either from seeds or from cuttings, it is well-known in the art to use small pots. The pots are traditionally made in a continuous process as disclosed in WO9203914 to obtain a cheap product that is relatively easy to handle. When the continuous blocks of growth medium are cut into pots/pieces of suitable size, each individual piece of the continuous block of growth medium is manually or automatically positioned into a propagation tray. An example of an automatic system is the Ellepot Multiflex, where a distributor with an X-Y movement mechanism distributes the individual pieces of the continuous block of growth medium into a propagation tray. The pieces are positioned one at the time as they move in a single line from the cutting means to the distributor. This system is limited by the minimum size of the individual pieces of the continuous block of growth medium, as pieces with a relatively low size (height relative to the diameter) has a tendency to tilt during the transportation towards the distributor.

SUMMARY OF THE INVENTION

It is an object of the present invention to provide a distributor apparatus or system that is capable of distributing low-size pots (height relative to the diameter) into a propagation tray. Furthermore, it is an object to provide a distributor apparatus that allows the apparatus adapted for producing a length of growth medium cut into pieces of suitable size to continue producing during the distribution operation, thereby increasing the productivity.

A first aspect relates to distributor apparatus adapted for positioning individual pieces of a length of growth medium cut into pieces of suitable size into a propagation tray, the distributor apparatus comprising:

a plurality of distributor units configured to move between a loading position and an unloading position; each distributor unit comprising an open-ended channel or cavity adapted for receiving a whole number of growth medium pieces; wherein the distributor units, in a loading position, are positioned relatively to each other such that their open-ended channels or cavities are disposed in continuation to each other to form a receiving unit with an open-ended channel or cavity adapted for receiving a single length of growth medium pieces; and wherein the distributor units, when in an unloading position, are rotated, relative to their loading position, such that their open-ended channels or cavities are disposed parallel relative to each other.

When transporting a length of growth medium cut into pieces of suitable size into the distributor apparatus in one operation, the individual pieces are capable of supporting each other, thereby avoiding that they tilt during the loading operation. Furthermore, the receiving unit is adapted to receive a "single" length of growth medium pieces. Hence, the size of the open-ended channel or cavity of the receiving unit also aids in stabilizing the position of the individual pieces. Preferably, the single length of growth medium pieces comprises 2-50 individual growth medium pieces, such as within the range of 3-45, e.g. within the range of 4-40, such as within the range of 5-35, e.g. within the range of 6-30, such as within the range of 7-25, e.g. within the range of 8-20, such as within the range of 9-15, e.g. within the range of 10-15 individual growth medium pieces. Hence, in one or more embodiments, the open-ended channel or cavity of the receiving unit is adapted for receiving a single length of growth medium pieces comprising 2-50 individual growth medium pieces, such as within the range of 3-45, e.g. within the range of 4-40, such as within the range of 5-35, e.g. within the range of 6-30, such as within the range of 7-25, e.g. within the range of 8-20, such as within the range of 9-15, e.g. within the range of 10-15 individual growth medium pieces.

The term "length of growth medium" refers to the production of growth medium, which is made in a continuous line as e.g. disclosed in WO9203914. The length of growth medium is thereafter cut into pieces of suitable size (height relative to the diameter), corresponding to the desired size of a propagation pot. Hence, a synonymous term to the term "length of growth medium" may be a "continuous block of growth medium". However, the length of a growth medium introduced into the receiving unit is a finite number of individual growth medium pieces, as disclosed above, preferably corresponding to the number of distributor units defining the receiving unit. The length of a growth medium introduced into the receiving unit may in some embodiments comprise a number of individual growth medium pieces that are lower than the number of individual growth medium pieces defining the receiving unit.

In one or more embodiments, the receiving unit is defined by 2-50 distributor units, such as within the range of 3-45, e.g. within the range of 4-40, such as within the range of 5-35, e.g. within the range of 6-30, such as within the range of 7-25, e.g. within the range of 8-20, such as within the range of 9-15, e.g. within the range of 10-15 distributor units. The last distributor unit (furthest away from the apparatus adapted for producing a length of growth medium cut into pieces of suitable size) may function as a stop unit, and may have one or two closed ends. In principle, the last distributor unit should not be included in the definition of the receiving unit.

Each distributor unit comprises an open-ended channel or cavity adapted for receiving a whole number (i.e. 1, 2, 3, etc.) of growth medium pieces. Preferably, each distributor unit comprises an open-ended channel or cavity adapted for receiving a single growth medium piece. This is the simplest configuration of a distributor unit with no risk of more than one growth medium piece leaving the open-ended channel or cavity at the time.

In one or more embodiments, the distributor apparatus further comprises a piston unit adapted for entering an open-ended channel or cavity of a distributor unit when in the unloading position, thereby releasing a single growth medium piece therefrom. This configuration secures that the growth medium piece leaves the open-ended channel or cavity at the right time.

In one or more embodiments, the open-ended channel or cavity of a distributor unit comprises holding means for releasably holding a growth medium piece when positioned therein. This configuration secures that the growth medium piece leaves the open-ended channel or cavity at the right time. This configuration may be combined with the piston unit as described above.

In one or more embodiments, the last distributor unit, i.e. the position farthest away from the apparatus adapted for producing a length of growth medium cut into pieces of suitable size, comprises a stop means configured for partly blocking the channel or cavity such that growth medium pieces will not escape the open-ended channel or cavity of the receiving unit during the loading operation.

In one or more embodiments, the distributor apparatus further comprises a first displacement means adapted for positioning a single length of growth medium cut into pieces of suitable size into the open-ended channel or cavity of the receiving unit, when the distributor units forming/defining said receiving unit, are in a loading position. Although the receiving unit may automatically receive the single length of growth medium from a production line as the length is increasing, it may be an advantage to use a displacement means to load the receiving unit faster. This configuration allows the production line to produce the growth medium during the loading operation. Otherwise, the production line will have to stop until the receiving unit is ready to be loaded again.

In one or more embodiments, the first displacement means is adapted for positioning a single length of 2-50 growth medium pieces of suitable size into the open-ended channel or cavity of the receiving unit, such as within the range of 3-45, e.g. within the range of 4-40, such as within the range of 5-35, e.g. within the range of 6-30, such as within the range of 7-25, e.g. within the range of 8-20, such as within the range of 9-15, e.g. within the range of 10-15 individual growth medium pieces into the open-ended channel or cavity of the receiving unit.

In one or more embodiments, the first displacement means comprises a spade blade, a first drive means, and a second drive means. The spade blade is configured for fitting within a cutting groove between two individual growth medium pieces. Preferably, the first drive means is configured to move the spade blade from a first position above or below or to one side of a cutting groove between two individual growth medium pieces to a second position within said cutting groove; and wherein the second drive means is configured to move the spade blade towards the open-ended channel or cavity of the receiving unit.

In one or more embodiments, the first displacement means is configured to move varying lengths of growth medium cut into pieces of suitable size into a compartment of the compartmentalized conveyor.

A second aspect relates to a system for packaging growth medium pots onto propagation trays comprising:
an apparatus adapted for producing a length of growth medium cut into pieces of suitable size; and
a distributor apparatus according to the present invention.

In one or more embodiments, the system comprises a plurality of distributor apparatuses according to the present invention, and wherein the apparatus adapted for producing a length of growth medium cut into pieces of suitable size is configured for positioning its outlet (alternatively, a plurality of outlets) from one receiving unit to another receiving unit. Alternatively, the apparatus adapted for producing a length of growth medium cut into pieces of suitable size may comprise two or more outlets, each adapted for being positioned in front of a receiving unit.

It may be requested to fill a propagation tray with propagation pots of varying sizes. In one or more embodiments, the first displacement means is configured for loading neighbouring compartments of the compartmentalized conveyor with varying lengths and/or diameters of lengths of growth medium cut into pieces of suitable size.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED DESCRIPTION OF THE INVENTION

Figure 1:
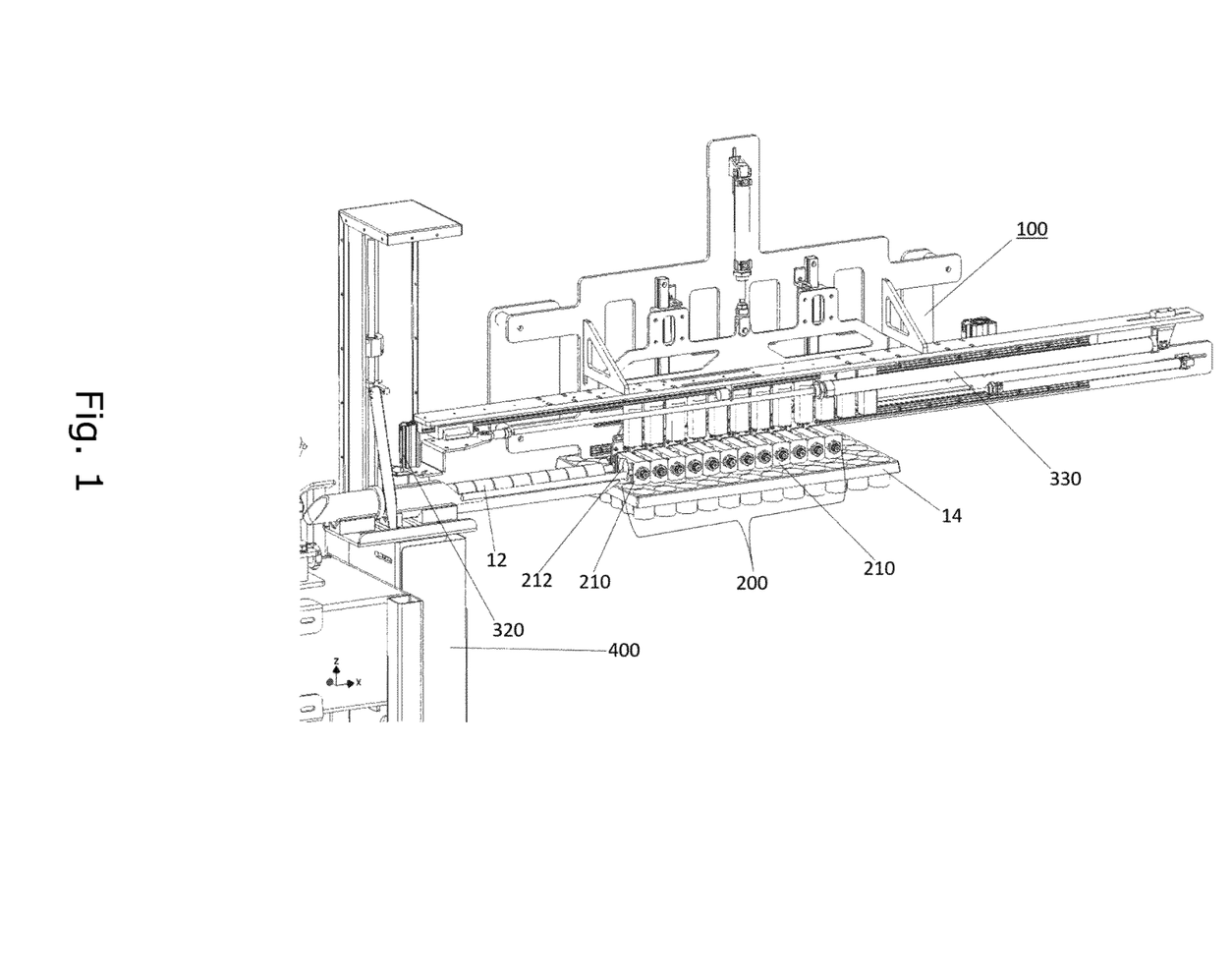
FIGS. 1-9 show still views of a first distributor apparatus in operation in accordance with various embodiments of the invention.
Figure 2:
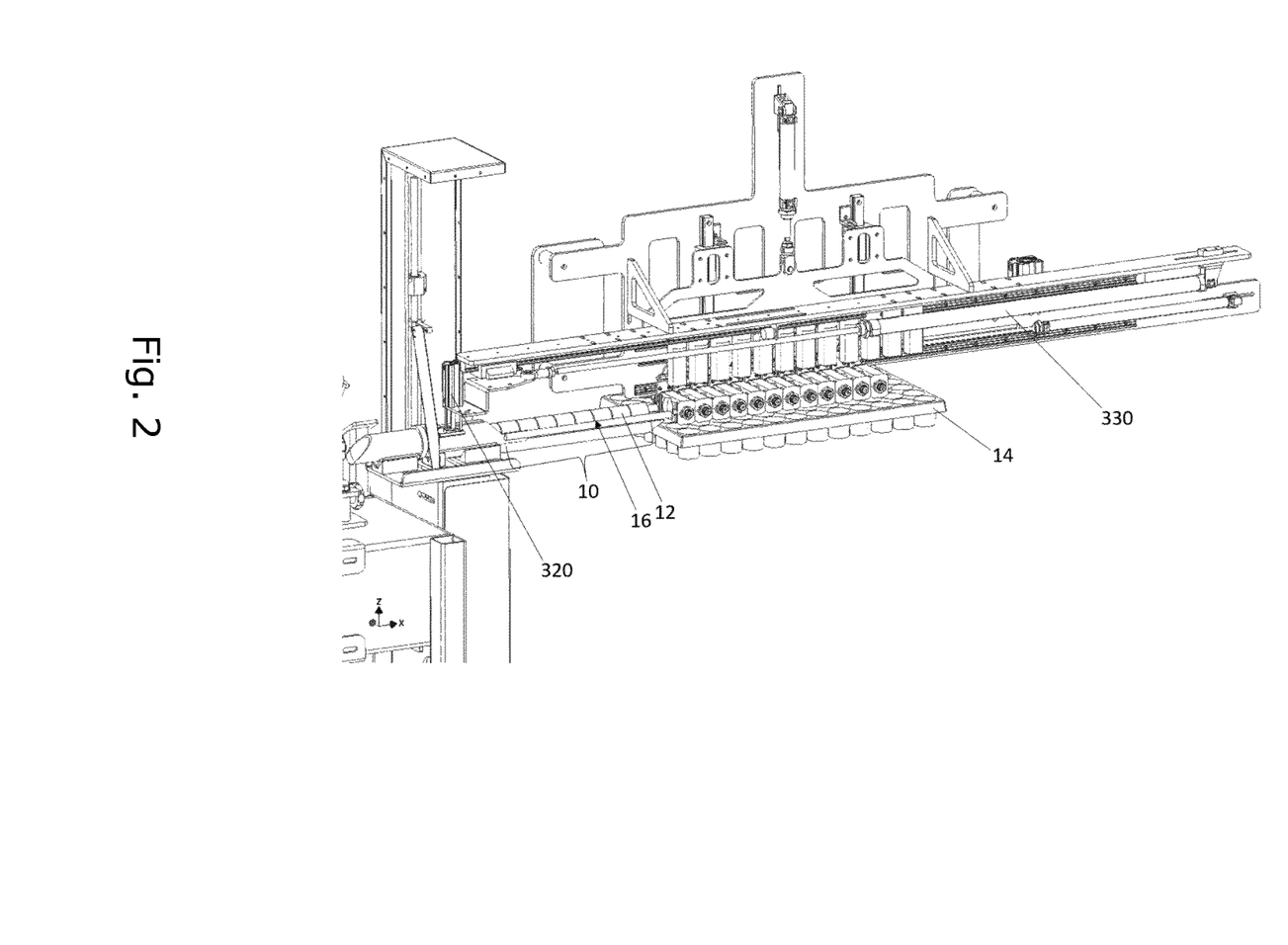
Figure 3:
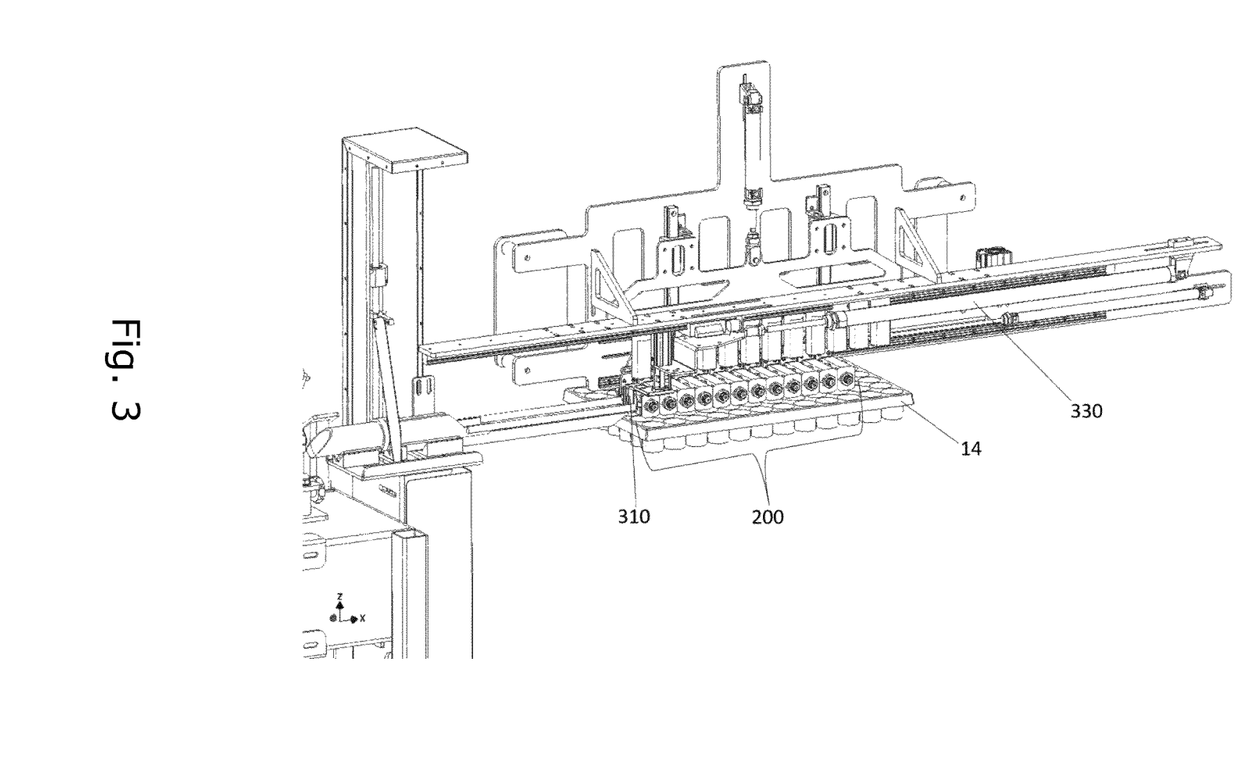

FIGS. 1-9 show still views of a first distributor apparatus in operation in accordance with various embodiments of the invention. FIG. 1 shows the initiation phase of the loading operation, where an apparatus 400 produces a length of growth medium cut into pieces 12 of suitable size. The distributor apparatus 100 comprises a plurality of distributor units 210 (more specifically 12 distributor units) configured to move between a loading position and an unloading position. Each distributor unit 210 comprises an open-ended channel or cavity 212 adapted for receiving a single growth medium piece 12. The distributor units 210 are positioned relatively to each other such that their open-ended channels or cavities 212 are disposed in continuation to each other to form a receiving unit 200 with an open-ended channel or cavity adapted for receiving a single length 10 (FIG. 2) of growth medium pieces 12. A first displacement means is shown comprising a spade blade 310 (not visible, but is shown in FIG. 3), a first drive means 320, and a second drive means 330. The spade blade 310 is configured for fitting within a cutting groove 16 (FIG. 2) between two individual growth medium pieces 12. In FIG. 1, the first drive means 320 is shown in a retracted position with the spade blade positioned above a cutting groove between two individual growth medium pieces, and in FIG. 2, the first drive means 320 is shown in an extended position with the spade blade within said cutting groove. In FIG. 3, the second drive means 330 has moved the spade blade 310 towards the open-ended channel or cavity of the receiving unit 200, such that the single length 10 of growth medium pieces 12 (more specifically 12 growth medium pieces) has been positioned within the open-ended channel or cavity of the receiving unit 200.

Figure 4:
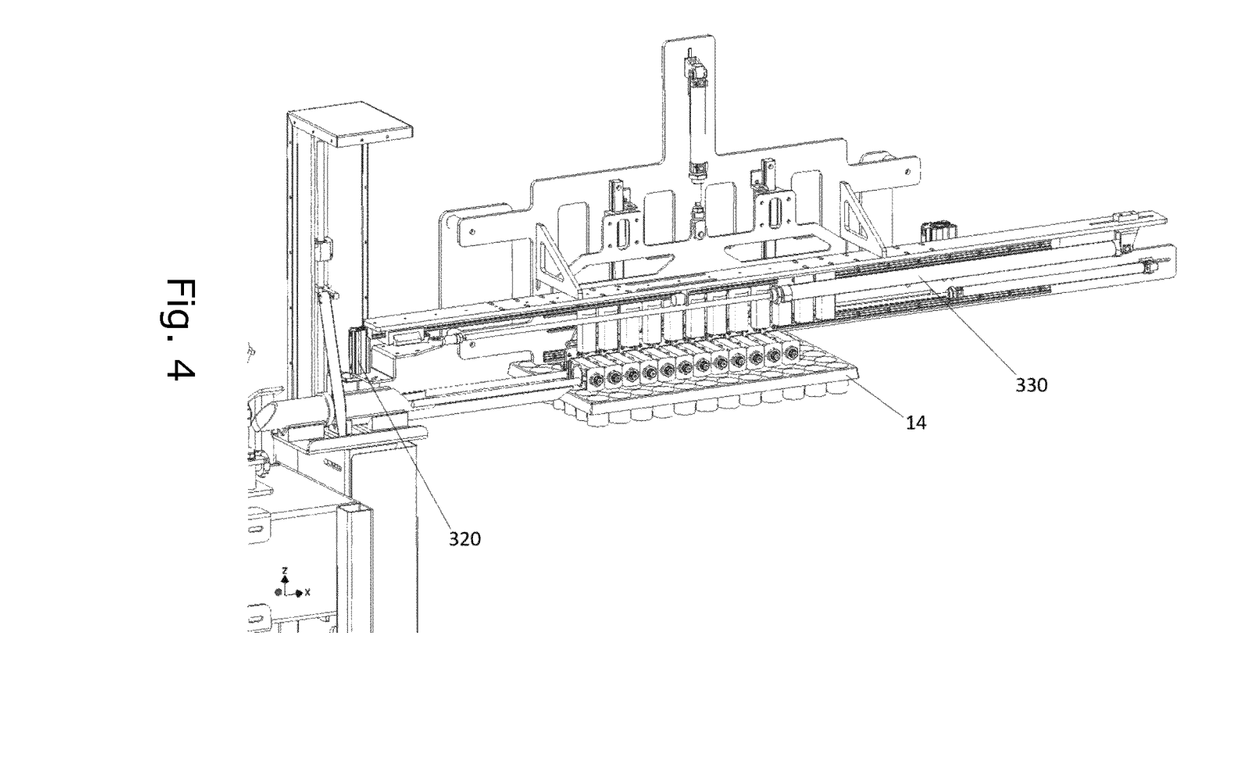
Figure 5:
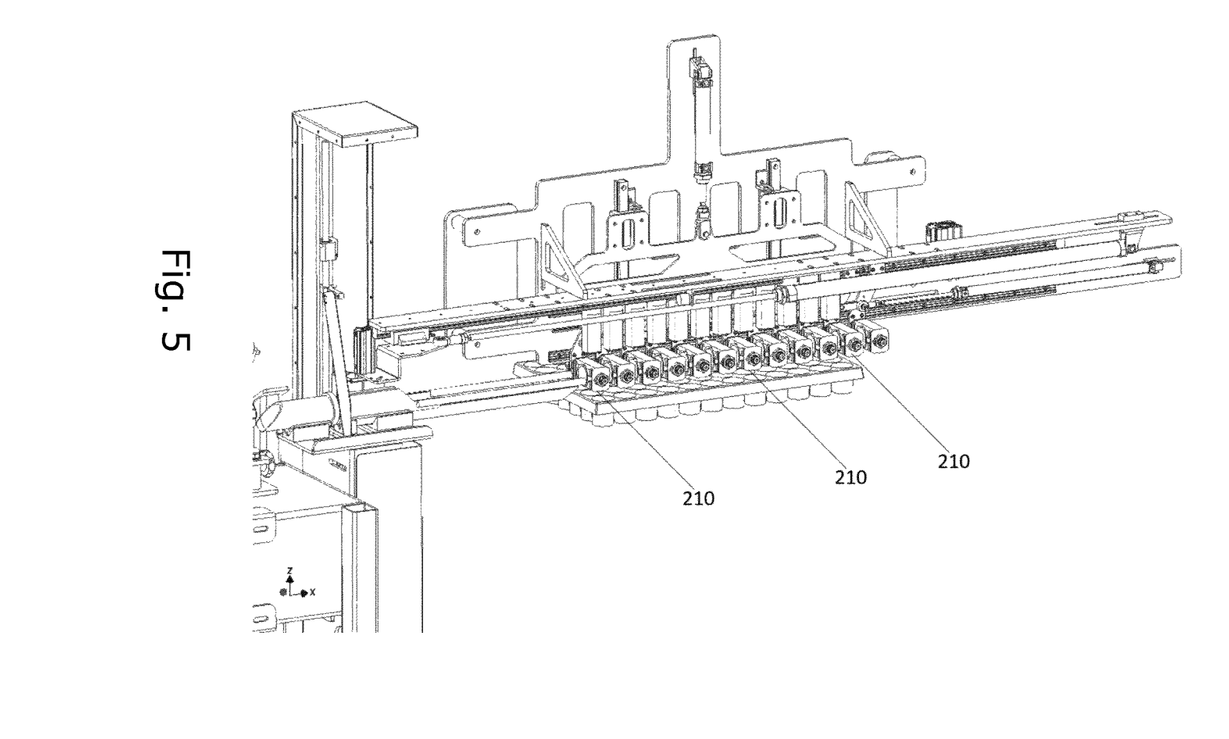
Figure 6:
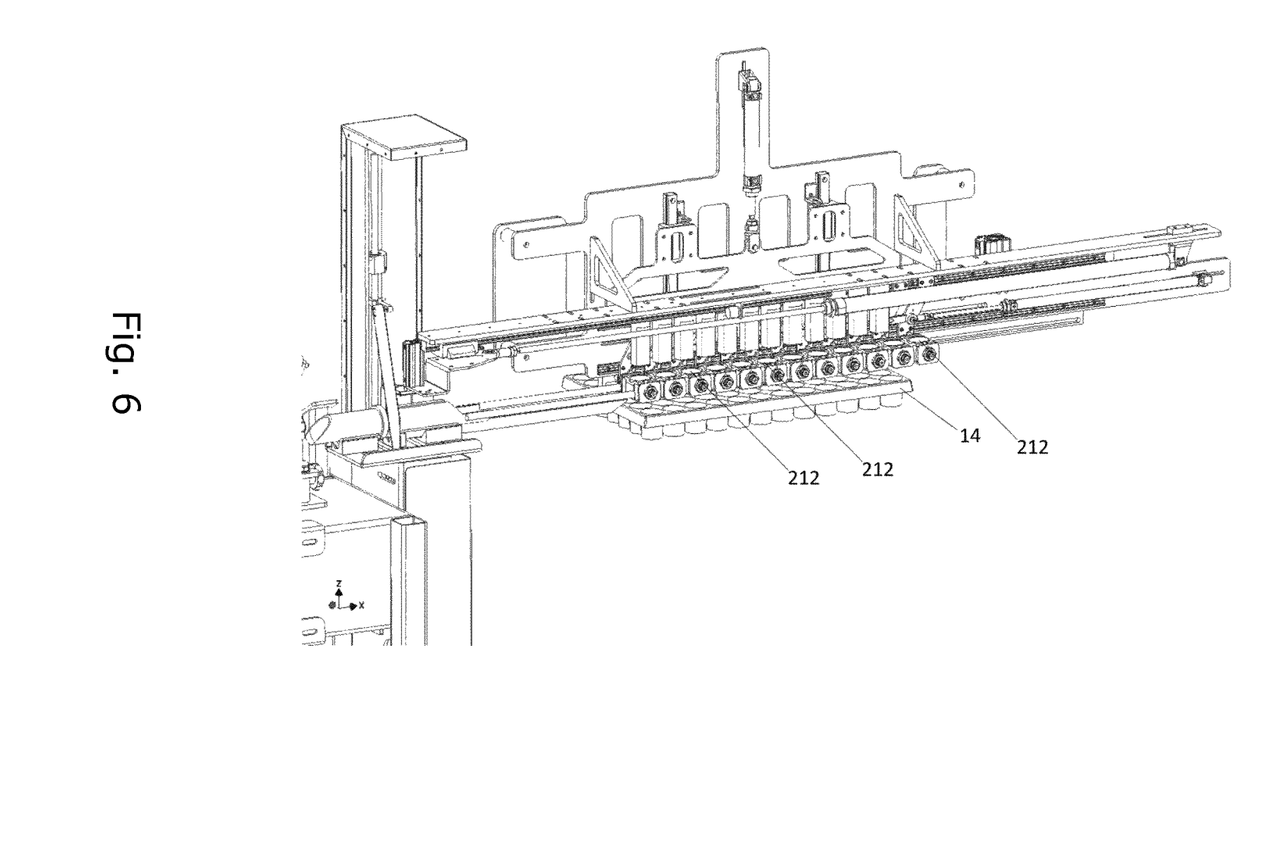
Figure 7:
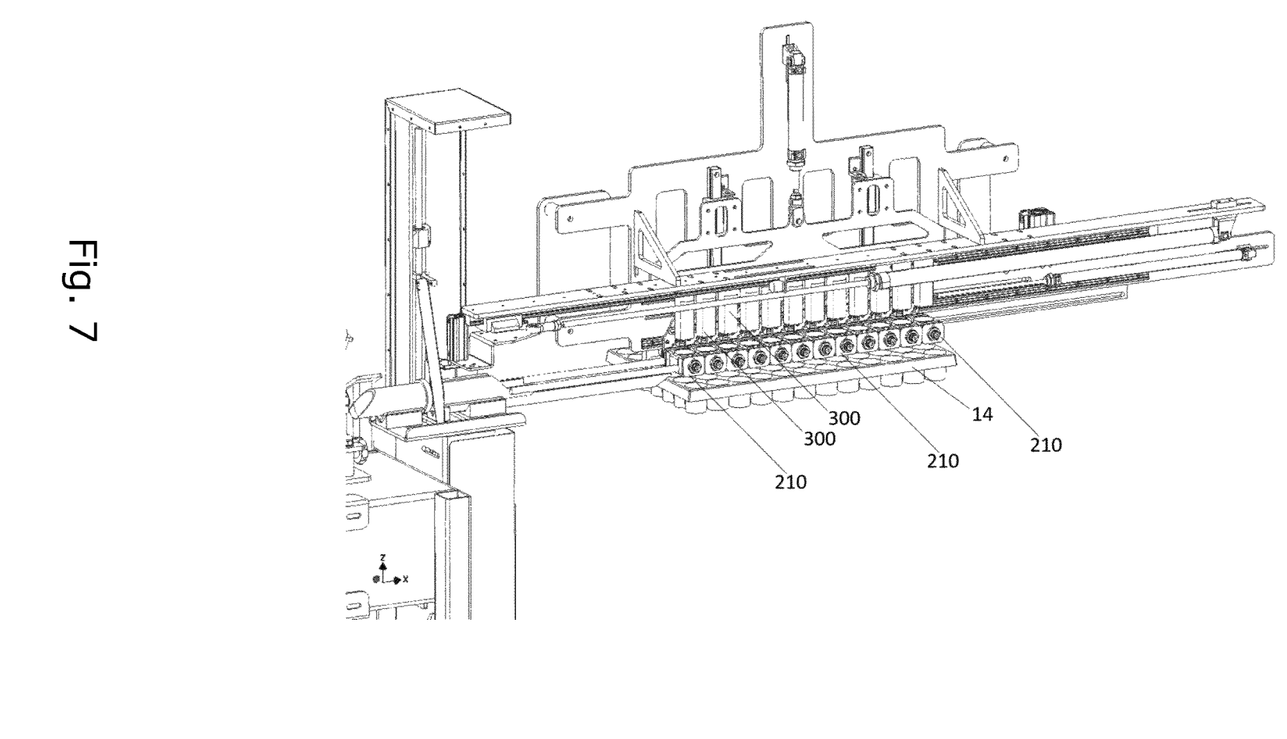
Figure 8:
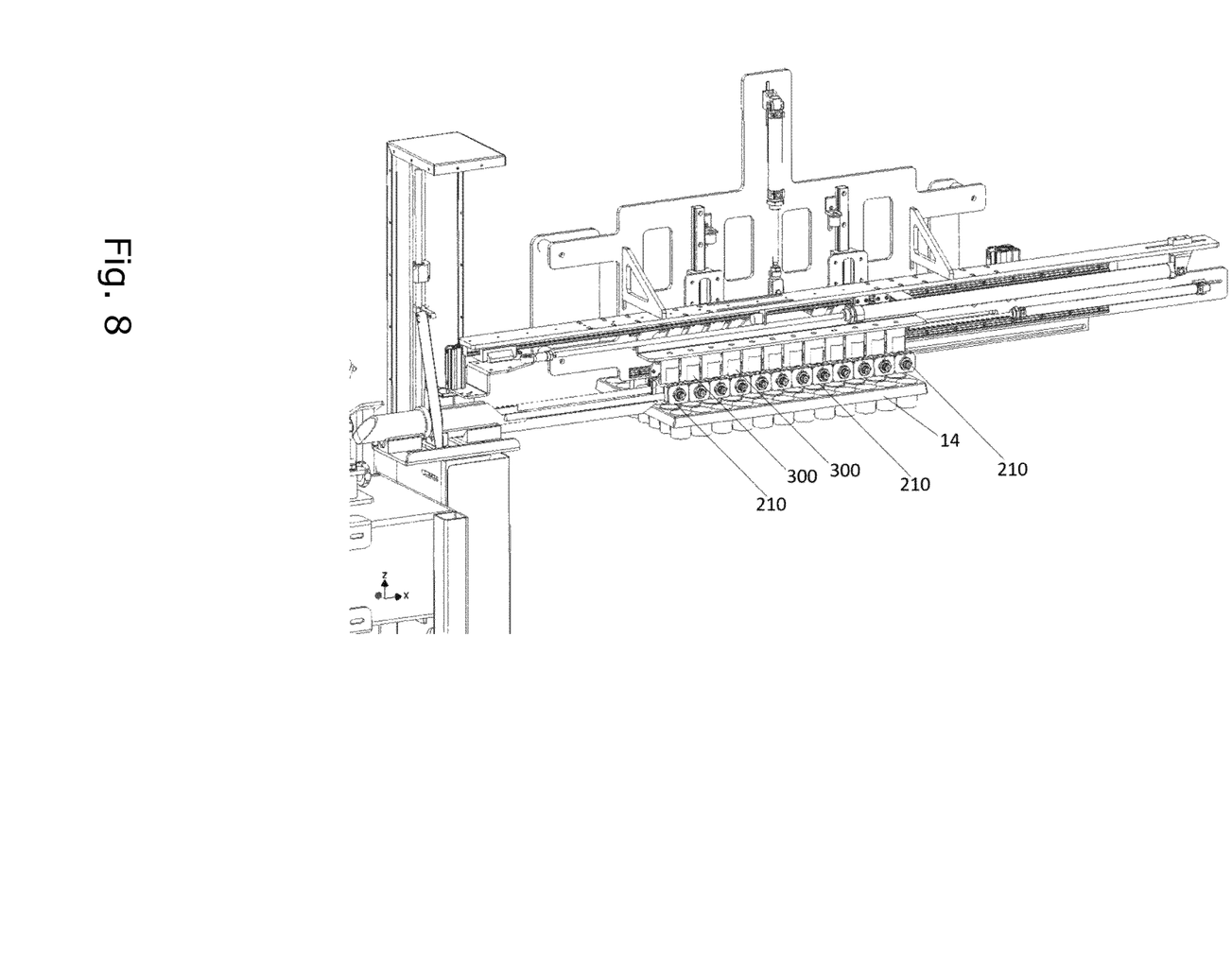
Figure 9:
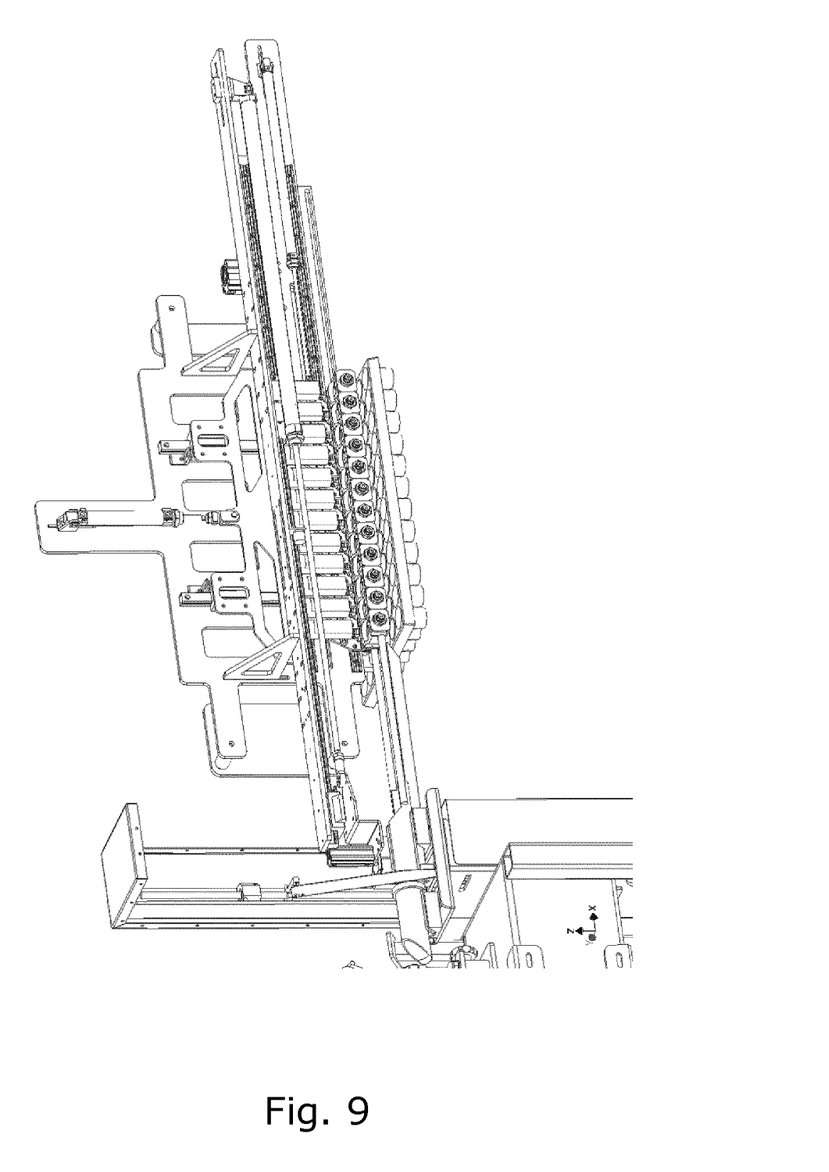

In FIG. 4, the second drive means 330 is has moved the spade blade 310 back to its starting position. In FIG. 5, the unloading operation is initiated. The single length of growth medium pieces has been divided into individual growth medium pieces by separating the distributor units 210 from one another. In FIG. 6, the distributor units 210 have been rotated relative to their loading position, such that their open-ended channels or cavities 212 are disposed parallel relative to each other. In FIG. 7, the distributor units 210 are aligned to be positioned correctly above the propagation tray 14. In FIG. 8, a piston unit 300 enters the open-ended channel or cavity 212 of each distributor unit 210, thereby releasing a single growth medium piece therefrom and into the propagation tray 14. The piston units may in one or more embodiments work independently from one another, or in groups. Thereby, a pattern of the growth medium pieces 12 are formed in the propagation tray 14, if e.g. a larger distance between the individual growth medium pieces 12 is needed to provide better growth conditions. In FIG. 9, the piston units 300 are retracted again, and the entire operation may be repeated.

Figure 10:
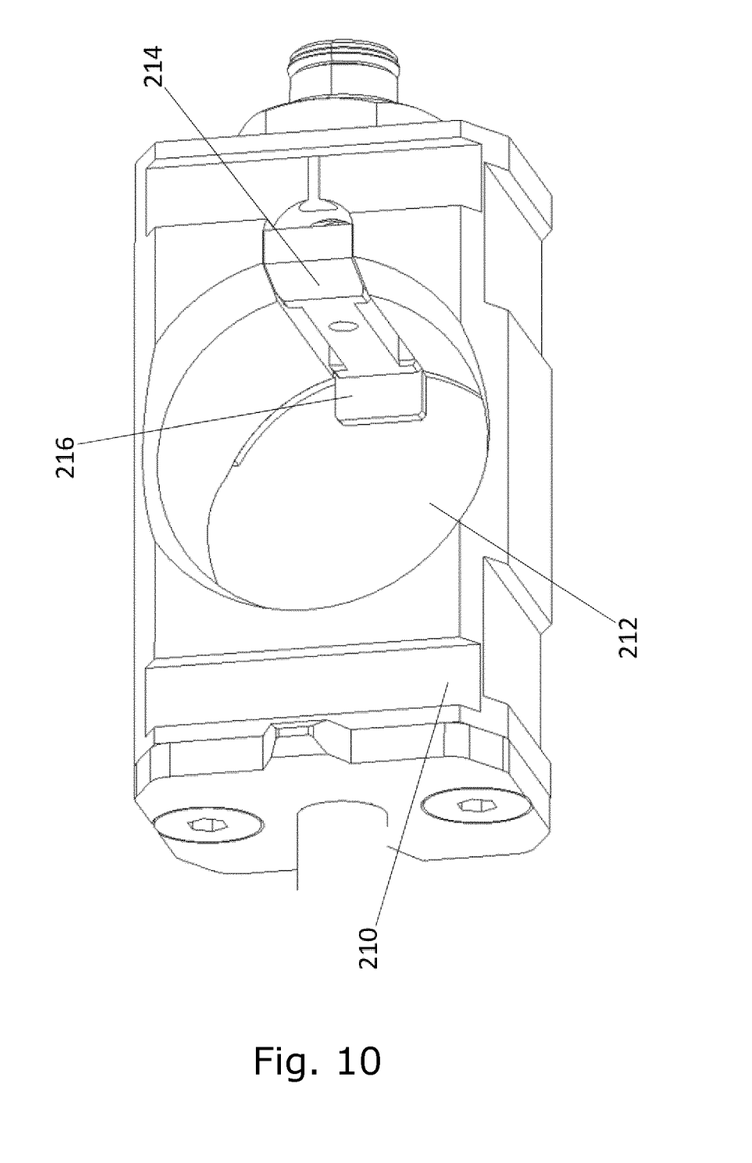
FIGS. 10-11 show still views of a distributor unit in operation in accordance with various embodiments of the invention.
Figure 11:
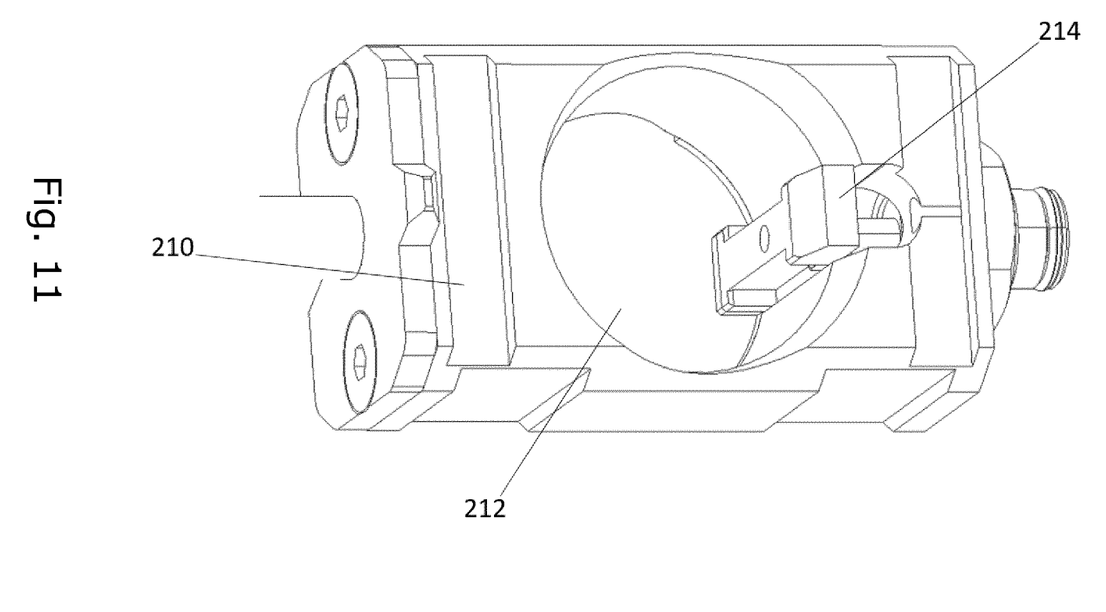

FIG. 10 shows a distributor unit 210, where the open-ended channel or cavity 212 of a distributor unit 210 comprises holding means 214 for releasably holding a growth medium piece when positioned therein. The holding means 214 is in a retracted position as necessary during the loading operation. In FIG. 11, the holding means 214 is in an extended position. The specific distributor unit shown is adapted for being positioned as the last distributor unit, i.e. the position farthest away from the apparatus adapted for producing a length of growth medium cut into pieces of suitable size. Hence, a stop means 216 (here a plate) is partly blocking the channel or cavity 212 such that growth medium pieces will not escape the open-ended channel or cavity of the receiving unit during the loading operation.

Figure 12:
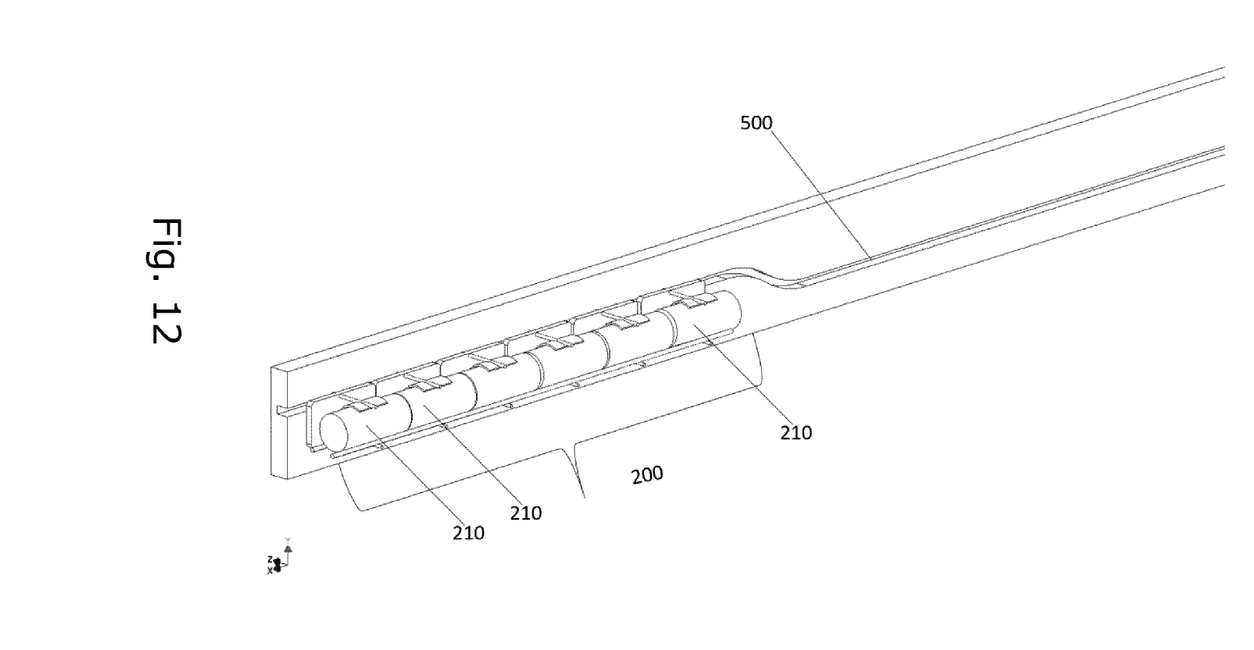
FIGS. 12-14 show still views of a second distributor apparatus in operation in accordance with various embodiments of the invention.
Figure 13:
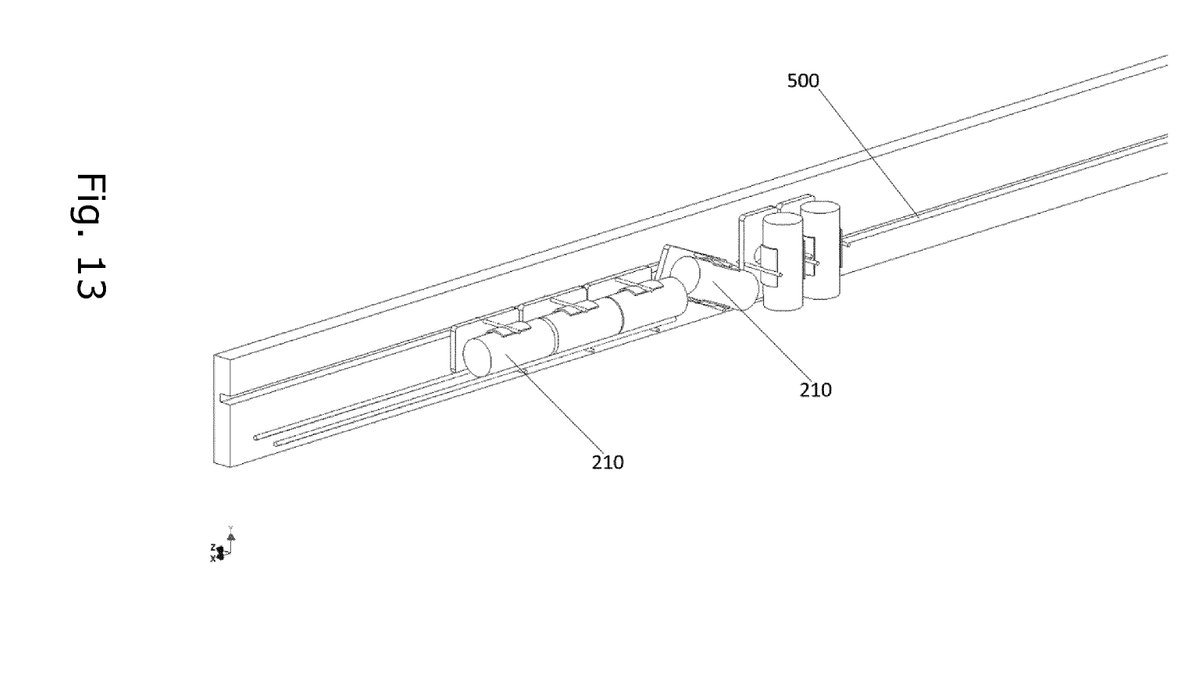
Figure 14:
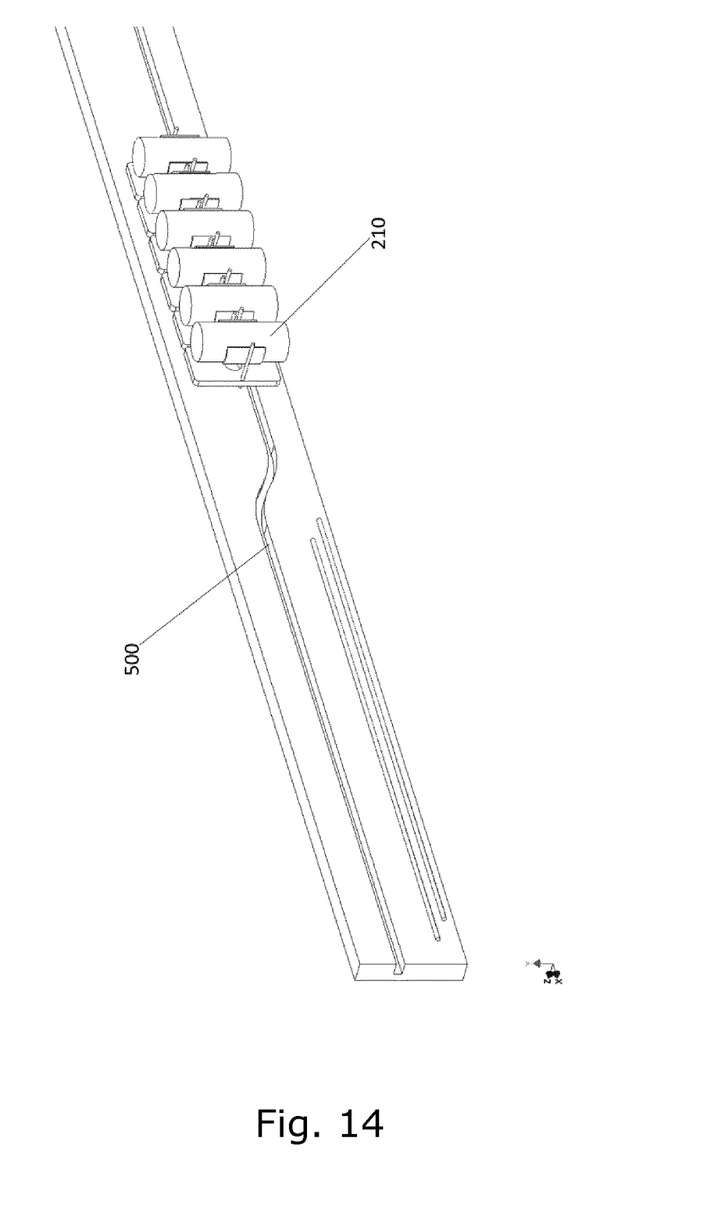

FIGS. 12-14 show still views of a second distributor apparatus in operation in accordance with various embodiments of the invention. FIG. 12 shows distributor units 210 that are positioned relatively to each other such that their open-ended channels or cavities 212 are disposed in continuation to each other to form a receiving unit 200 with an open-ended channel or cavity adapted for receiving a single length of growth medium pieces. In FIG. 13, a part of the distributor units 210 have been rotated relative to their loading position, such that their open-ended channels or cavities 212 are disposed parallel relative to each other. In FIG. 14, all distributor units 210 have been rotated. The rotation is performed using a curved track 500.

REFERENCES

10 Length of growth medium
12 Piece of growth medium
14 Propagation tray
16 Cutting groove
100 Distributor apparatus
200 Receiving unit
210 Distributor unit
212 Channel or cavity
214 Holding means
216 Stop means
300 Piston unit
310 Spade blade
320 First drive means
330 Second drive means
400 Apparatus adapted for producing a length of growth medium cut into pieces of suitable size
410 Outlet
500 Curved track

The invention claimed is:

1. A distributor apparatus (100) adapted for positioning individual pieces (12) of a length (10) of growth medium cut into pieces (12) of suitable size into a propagation tray (14), the distributor apparatus (100) comprising:
   a plurality of distributor units (210) configured to move between a loading position and an unloading position;
   each distributor unit (210) comprising an open-ended channel or cavity (212) adapted for receiving a whole number of growth medium pieces (12);
   wherein the distributor units (210), in the loading position, are positioned relative to each other such that their open-ended channels or cavities (212) are disposed in continuation to each other to form a receiving unit (200) with the open-ended channel or cavity adapted for receiving a single length (10) of growth medium pieces (12); and
   wherein the distributor units (210), when in the unloading position, are rotated, relative to their loading position, such that their open-ended channels or cavities (212) are disposed parallel relative to each other.

2. The distributor apparatus (100) according to claim 1, wherein the plurality of distributor units (210), each comprises the open-ended channel or cavity (212) adapted for receiving one growth medium piece (12) of the growth medium pieces (12).

3. The distributor apparatus (100) according to claim 1, wherein the receiving unit (200) comprises the open-ended channel or cavity adapted for receiving a single length (10) of 2-50 growth medium pieces (12).

4. The distributor apparatus (100) according to claim 1, further comprising a piston unit (300) adapted for entering the open-ended channel or cavity (212) of the distributor unit (210) when in the unloading position, thereby releasing one growth medium piece (12) of the growth medium pieces (12) therefrom.

5. The distributor apparatus (100) according to claim 1, wherein the open-ended channel or cavity (212) of the distributor unit (210) comprises holding means (214) for releasably holding one medium piece (12) of the growth medium pieces (12) when positioned therein.

6. The distributor apparatus (100) according to claim 1, further comprising a first displacement means adapted for positioning a single length (10) of growth medium cut into pieces (12) of suitable size into the open-ended channel or cavity of the receiving unit (200), when the distributor units (210) forming said receiving unit (200), are in the loading position.

7. The distributor apparatus (100) according to claim 6, wherein the first displacement means is adapted for positioning a single length (10) of 2-50 growth medium pieces (12) of suitable size into the open-ended channel or cavity of the receiving unit (200).

8. The distributor apparatus (100) according to claim 6, wherein the first displacement means comprises a spade blade (310), a first drive means (320), and a second drive means (330); wherein the spade blade (310) is configured for fitting within a cutting groove (16) between two individual growth medium pieces (12); wherein the first drive means (320) is configured to move the spade blade from a first position above or below or to one side of a cutting groove (16) between two individual growth medium pieces (12) to a second position within said cutting groove (16); and wherein the second drive means (330) is configured to move the spade blade (310) towards the open-ended channel or cavity of the receiving unit (200).

9. A system for packaging growth medium pots onto propagation trays comprising:
   an apparatus (400) adapted for producing a length (10) of growth medium cut into pieces (12) of suitable size; and
   a distributor apparatus (100) according to claim 1.

10. The system according to claim 9, comprising a plurality of distributor apparatuses (100) and wherein the apparatus (400) adapted for producing a length (10) of growth medium cut into pieces (12) of suitable size is configured for positioning its outlet (410) from one receiving unit (200) to another receiving unit (200).

\* \* \* \* \*

UNITED STATES PATENT AND TRADEMARK OFFICE
CERTIFICATE OF CORRECTION

PATENT NO. : 11,357,179 B2
APPLICATION NO. : 16/620794
DATED : June 14, 2022
INVENTOR(S) : Peter Meldgaard Jacobsen It is certified that error appears in the above-identified patent and that said Letters Patent is hereby corrected as shown below:

In the Claims

Claim 5, Column 6, Line 48, please delete "releasably holding one medium piece" and insert --releasably holding one growth medium piece--

Signed and Sealed this
Eleventh Day of October, 2022

Katherine Kelly Vidal
*Director of the United States Patent and Trademark Office*